United States Patent [19]

Hassan

[11] Patent Number: 5,742,619
[45] Date of Patent: Apr. 21, 1998

[54] METHOD AND APPARATUS FOR CONCATENATED CODING OF MOBILE RADIO SIGNALS

[75] Inventor: Amer A. Hassan, Research Triangle Park, N.C.

[73] Assignee: Ericsson Inc., Research Triangle Park, N.C.

[21] Appl. No.: 678,314

[22] Filed: Jul. 11, 1996

[51] Int. Cl.$^6$ .................................................. H03M 13/12
[52] U.S. Cl. ...................... 371/37.4; 371/37.06; 371/43.3
[58] Field of Search ............................... 371/37.4, 37.06, 371/43.3

[56] References Cited

U.S. PATENT DOCUMENTS

| | | | |
|---|---|---|---|
| 3,457,562 | 7/1969 | Fano | 371/37.2 |
| 3,665,396 | 5/1972 | Forney, Jr. | 371/46 |
| 4,797,887 | 1/1989 | Yamasaki et al. | 371/43.3 |
| 5,014,276 | 5/1991 | Bush et al. | 371/5.1 |

OTHER PUBLICATIONS

Shu Lin and Daniel J. Costello, Jr. *Error Control Coding: Fundamentals and Applications* Chapter 12, Prentice Hall Publishers.

Primary Examiner—Stephen M. Baker
Attorney, Agent, or Firm—Burns, Doane, Swecker & Mathis, L.L.P.

[57] ABSTRACT

A concatenated coding scheme having at least two levels of coding. According to the exemplary embodiments, a first decoding scheme is used to decode a demodulated sequence provided that the mathematical combination of the number of computations and the amount of memory required to decode the sequence does not exceed a threshold value. If the threshold value is exceeded, due to, for example, excessive noise in the channel, a secoding decoding scheme is used to decode the sequence.

24 Claims, 1 Drawing Sheet

METHOD AND APPARATUS FOR CONCATENATED CODING OF MOBILE RADIO SIGNALS

FIELD OF THE INVENTION

The present invention relates to digital data transmission. More particularly, this invention relates to data protection using error control coding for digital data transmission in a satellite mobile radio communication system.

BACKGROUND OF THE INVENTION

In digital communication systems, information is transmitted from a sender to an end user over a physical channel. Examples of physical channels include a radio channel, an optical fiber, a coaxial cable, and twisted copper wires. These channels cause transmission errors, resulting in a corrupted received message. To overcome this problem and reduce the number of errors incurred by the channel, the transmitter power can be increased. However, this is typically not practical due to limitations of the transmitter electronics, regulations on peak power transmission, and the expense of additional power, such as the case of transmission from a satellite or a mobile phone.

A common technique used to combat noise, and to effectively reduce the number of errors introduced by the channel, is to introduce redundancy in the transmitted message. The redundancy can be used at the receiver to correct errors. The redundancy is implemented by what is commonly called error control codes (sometimes also called channel codes).

In conventional error control or channel coding schemes, the number of errors corrected is determined by the codebook considered and by a decoding algorithm. The decoding algorithm is usually hardwired in an ASIC chip or programmed in a digital signal processor (DSP). In either case, the error correction capabilities of the decoder are fixed. Thus, even if more resources are available in the receiver such as more memory, or an increased MIPS capacity, the decoding algorithm is unable to correct more errors.

The most commonly used coding scheme is convolutional coding, which typically requires a Viterbi algorithm at the receiver. Convolutional codes can be implemented by a shift register encoder with m memory elements (m or sometimes m+1 is called the constraint length of the code). The larger the value of m, the better the performance of the communication system. Unfortunately, the complexity of a receiver incorporating a Viterbi decoder increases exponentially with the constraint length of the code. This is because the Viterbi algorithm searches the entire trellis characterizing the code to determine the most likely transmitted sequence of data. For codes having a constraint length m=10 or more, a suitable real-time Viterbi receiver is impractical.

In most mobile radio applications, and particularly in satellite radio applications, relatively slight reductions in power can result in significant cost savings, and are therefore highly desirable. A decoder with a large m value for such applications with reasonable complexity, but without compromising performance, is highly desirable. Sequential decoding is a method by which only a subset of the trellis is searched. A detailed explanation of conventional sequential decoding can be found in Shu Lin and Daniel J. Costello, Jr, *Error Control Coding: Fundamentals and Applications*, Chapter 12, available from Prentice Hall Publishers. In sequential decoding techniques, the decoder discards improbable paths and searches only paths that have high probability. Occasionally, the decoder tracks back and inserts a previously discarded path. The shortcoming of sequential decoding is that when the channel is very noisy the decoder will perform too many computations before progressing forward to decode additional symbols. This causes unacceptable delay for real time applications such as voice communications, and in applications where low battery consumption is desired, such as in hand-held radio products.

It would be desirable to provide a coding scheme for improving transmission performance over noisy channels while avoiding unacceptable transmission delay and minimizing power consumption.

SUMMARY OF THE INVENTION

The present invention solves the foregoing problems and achieves other advantages by providing for a concatenated coding system with multiple levels of coding. The coding levels can be convolutional codes or block codes. One of the coding schemes can be an M-ary level modulation scheme. According to the present invention, a sequential decoding scheme is used to decode the first coding level, allowing the encoder to have a large constraint length. The decoder complexity, as defined by a mathematical combination of storage resources and the number of calculations performed, is compared to one or more threshold values. Based on the comparison the inner (or first level) decoder continues to decode, or halts decoding and the outer (second level) decoder continues the decoding process using a second coding scheme. The method and arrangement of the present invention allows the receiver to use all of the correction and storage resources available in the system to correct the largest number of errors. The invention can be implemented in a digital communication system including two encoding circuits and two decoding circuits.

BRIEF DESCRIPTION OF THE DRAWINGS

The present invention can be more fully understood by reading the following Detailed Description of the Preferred Embodiments in conjunction with the accompanying figure, in which.

DETAILED DESCRIPTION OF THE INVENTION

Figure 1:
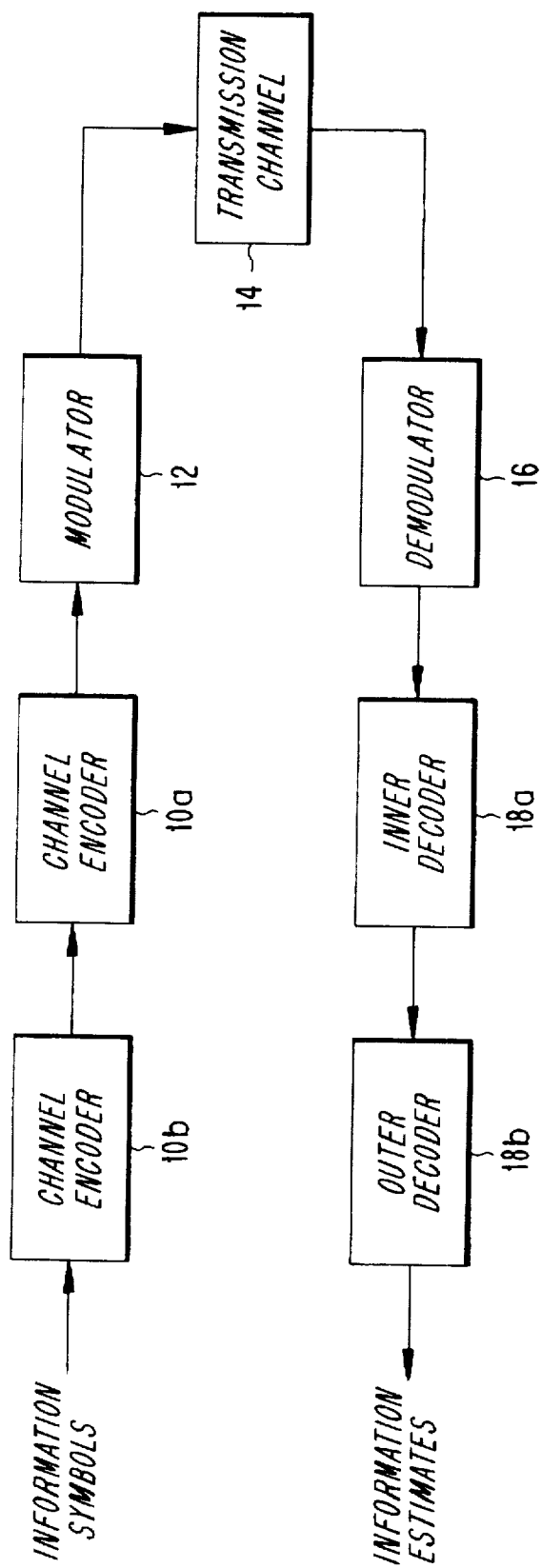
FIG. 1 is a block diagram of an exemplary communications system according to an embodiment of the present invention.

Referring to FIG. 1, an exemplary communications system for implementing an embodiment of the present invention is shown. The system includes outer and inner channel encoders 10a and 10b, respectively, for encoding information symbols received, e.g., from a speech coder or a computer terminal. The information symbols are the input to the outer channel encoder 10a. The outer code employed by outer encoder 10a can be a convolutional code, but is preferably a block code such as a Reed-Solomon code or other suitable block code. The outer code can be characterized by a parameter called the minimum distance d of the code, which is a measurement of the complexity of the code. For example, for a code which includes codewords C1, C2 . . . Cm, where d(Ci, Cj) is the number of places where two different codewords Ci, Cj differ, the minimum distance d=mind (Ci, Cj) for all unequal i and j values. The code can correct all errors e if 2e<d.

The outer code is then input to the inner encoder 10b, which provides a second level of encoding. The inner encoder 10b outputs the inner code. The inner encoder 10b preferably has a large constraint length; that is, the code is preferably a relatively powerful code.

The symbols output by inner encoder 10b are modulated in modulator 12, filtered in a first filter (not shown) and transmitted over a physical channel 14. At the receiver the output of the channel is filtered in a second filter (not shown), amplified, and demodulated in demodulator 16. Due to noise in the channel 14, some portion of the received sequence output by the demodulator 16 is erroneous.

The demodulated sequence is input to an inner decoder 18a, which is a sequential decoder characterized by two fundamental thresholds: a complexity threshold, which is a mathematical combination of storage complexity and computation complexity, and is the upper limit on the complexity of the receiver; and a channel or noise threshold, which the inner decoder 18a uses to determine if the decoder estimates are too noisy. As long as the complexity threshold is not exceeded, the inner decoder 18a can backtrack and include previously dropped paths to improve decoding performance.

During the decoding performed by inner decoder 18a, the received sequence at any given time requires some mathematical combination of a buffer storage amount S and the performance of C computations by the receiver. This mathematical combination represents the complexity of the decoder. The mathematical combination can be a linear combination of the form $\beta S + \chi C$, or can be a nonlinear function of values S and C, or of other equivalent parameters. The mathematical combination can be compared to one or more threshold values and the output of the decoder can be determined based on the comparison with the one or more threshold values. As an example, an output Z of the inner decoder 18a can be summarized by the following decision process:

$$Z = \begin{cases} r & \beta S + \chi C \leq T \\ \text{erasure} & \beta S + \chi C > T \end{cases}$$

The first condition indicates that the inner decoding can be completed without exceeding the complexity of the decoder, and the estimated inner code symbols can be described by a vector r. The inner code can also output estimate codewords associated with the values. The second condition indicates that the complexity of the decoder is exceeded before reaching a decision on the inner code symbols. That is, erasures are declared by the decoder when the complexity threshold is exceeded, indicating excessive channel noise or that the estimates are probably erroneous. Thus, an erasure output indicates that too many computations were incurred by the inner decoder 18a due to a noisy and unreliable channel. As will be appreciated by those of skill in the art, an erasure is a loss of data. It is frequently desirable to generate an erasure rather than an incorrect bit or symbol. The receiver cannot perform more computations and thus the outer decoder preferably fills in the coded bits which were lost and resulted in erasures being output by the decoder.

Further, when the complexity of the decoder is exceeded, the decoder can output partial decisions (that is, estimates of symbols along with soft values, or estimates of portions of symbols) in addition to, or in the place of erasures. As will be appreciated by those skilled in the art, soft values are reliability indicators which can be generated by a receiver to indicate the reliability of a decoded bit or symbol.

The parameters $\beta$ and $\chi$ in this example of a linear mathematical combination are design parameters that vary depending on the particular application. Some decoders have a relatively large storage capacity and relatively small computation capacity, while other decoders have greater computation capabilities than storage capacity. The weights $\beta$ and $\chi$ reflect the relative costs of buffer storage and computations.

The symbols output by inner decoder 18a to the outer decoder can be one of three types: incorrect symbols, if the inner decoding did not exceed the complexity constraint and the resulting inner code symbols have an erroneous subset; correct symbols, if the inner decoding did not exceed the complexity constraint and the resulting inner code symbols are all correct; and erased symbols, if the complexity constraint is exceeded and the resulting output consists entirely or partly of erasures and/or soft values.

The outer decoder 18b can be implemented by a bounded distance decoder or other suitable decoder. Such a decoder could for example, correct any combination (or position) of e errors and f erasures where $$2e + f \leq d - 1$$

where d is the minimum distance of the outer code. Notice that the code in this example is capable of correcting twice as many erasures than errors. By, declaring erasures when the complexity constraint is exceeded, indicating that the channel is noisy and it is likely that any estimate is in error, the system performance is improved. If, for example, X errors will occur in a conventional system without the method of the present invention, the decoder can correct 2X erasures using the method of the present invention. It will be appreciated that other decoding schemes having other suitable characteristics can be used.

An important feature of the present invention is that the receiver, which can include one or more demodulators and one or more detectors is capable of using all resources (that is, all decoder memory and calculation capabilities) available to decode the received signals regardless of whether concatenated coding is used or not. The invention may be implemented using a demodulator which demodulates a received signal by performing calculations and storing the results of the calculations in a memory, so long as a maximum capacity defined by a mathematical combination of the number of calculations and stored results is not exceeded. During intervals when the maximum capacity of the demodulator is exceeded, the demodulator can output erasures and/or soft information for use by a decoder to decode and/or demodulate the received signal during these intervals.

While the foregoing description includes numerous details and specificities, these are included for illustrative purposes only, and are not to be construed as limitations of the present invention. Many modifications will be readily apparent to those of ordinary skill in the art from the illustrative examples described herein which do not depart from the spirit and scope of the present invention, as defined by the following claims and their legal equivalents.

What is claimed is:

1. A communication system, comprising:
   an outer encoder for encoding a sequence of information symbols with a first code to generate an outer encoded sequence;
   an inner encoder for encoding the outer encoded sequence with a second code to generate an inner encoded sequence;
   a modulator for modulating the inner encoded sequence and transmitting the modulated sequence over a transmission channel;

a demodulator for receiving and demodulating the modulated sequence to generate a demodulated sequence;

an inner decoder for decoding the demodulated sequence using a first decoding scheme by performing a number of calculations and storing results of the calculations in a memory, and for performing a comparison of a mathematical combination of the number of calculations and results and one or more threshold levels; and an outer decoder for decoding the demodulated sequence using a second decoding scheme based on the comparison.

2. The communication system of claim 1, wherein the mathematical combination is a nonlinear function of the number of calculations and the number of results.

3. The communication system of claim 1, wherein the mathematical combination is of the form $\beta S + \chi C$, where S indicates an amount of memory used to store the results, C is the number of calculations, and $\beta$ and $\chi$ are weighting factors.

4. The communication system of claim 1, wherein the inner decoder outputs erasures during portions of the demodulated sequence in which the mathematical combination exceeds one of the one or more threshold levels.

5. The communication system of claim 1, wherein the inner decoder outputs soft values, erasures, or both during portions of the demodulated sequence in which the mathematical combination exceeds one of the one or more threshold levels.

6. The communication system of claim 4, wherein the inner decoder outputs a combination of erroneous symbols and correct symbols during portions of the demodulated sequence in which the mathematical combination does not exceed the threshold level.

7. The communication system of claim 6, wherein the outer decoder corrects any combination of erroneous symbols and erasures where $2e+f \leq (d-1)$, where e is a number of erroneous symbols, f is a number of erasures, and d is a minimum distance of the second code.

8. A method for transmitting communication signals, comprising the steps of:

encoding a sequence of information symbols with a first code to generate an outer encoded sequence;

encoding the outer encoded sequence with a second code to generate an inner encoded sequence;

modulating the inner encoded sequence and transmitting the modulated sequence over a transmission channel;

receiving and demodulating the modulated sequence to generate a demodulated sequence;

decoding the demodulated sequence using a first decoding scheme by performing a number of calculations, storing results of the calculations in a memory, and performing a comparison of a mathematical combination of the number of calculations and results and one or more threshold levels; and decoding the demodulated sequence using a second decoding scheme based on the comparison.

9. The method of claim 8, wherein the mathematical combination is a nonlinear function of the number of calculations and the number of results.

10. The method of claim 8, wherein the mathematical combination is of the form $\beta S + \chi C$, where S indicates an amount of memory used to store the results, C is the number of calculations, and $\beta$ and $\chi$ are weighting factors.

11. The method of claim 8, wherein the step of decoding the demodulated sequence produces erasures during portions of the demodulated sequence in which the mathematical combination exceeds the threshold level.

12. The method of claim 8, wherein the step of decoding the demodulated sequence produces soft values, erasures, or both during portions of the demodulated sequence in which the mathematical combination exceeds one of the one or more threshold levels.

13. The method of claim 11, wherein the step of decoding produces a combination of erroneous symbols and correct symbols during portions of the demodulated sequence in which the mathematical combination does not exceed the threshold level.

14. The method of claim 13, wherein the step of decoding corrects any combination of erroneous symbols and erasures where $2e+f \leq (d-1)$, where e is a number of erroneous symbols, f is a number of erasures, and d is a minimum distance of the second code.

15. A communication system, comprising:

means for encoding a sequence of information symbols with one or more codes to generate an encoded sequence;

modulation means for modulating the encoded sequence and transmitting the modulated sequence over a transmission channel;

demodulation means for receiving and demodulating the modulated sequence to generate a demodulated sequence; and decoding means for performing one or more first decodings of the demodulated sequence using one or more of the one or more codes when a maximum capacity for performing a number of calculations based on the one or more of the one or more codes and storing results of the calculations is not exceeded, the decoding means performing one or more second decodings to decode portions of the demodulated sequence during which the maximum capacity is exceeded.

16. The communication system of claim 15, wherein the maximum capacity is a mathematical function of the number of calculations and the number of results.

17. The communication system of claim 16, wherein the maximum capacity is of the form $\beta S + \chi C$, where S indicates an amount of memory used to stored the results, C is the number of calculations, and $\beta$ and $\chi$ are weighting factors.

18. The communication system of claim 15, wherein the decoding means generates erasures, soft values, or both during the portions of the demodulated sequence during which the maximum capacity is exceeded.

19. The communication system of claim 15, wherein the decoding means produces partially decoded symbols during the one or more first decodings.

20. The communication system of claim 15, wherein the one or more first decodings produces a combination of erroneous symbols and correct symbols during the portions of the demodulated sequence during which the maximum capacity is not exceeded, and wherein the one or more second decodings correct the erroneous symbols produced during the one or more first decodings.

21. The communication system of claim 20, wherein the decoding means corrects any combination of erroneous symbols and erasures where $2e+f \leq (d-1)$, where e is a number of erroneous symbols, f is a number of erasures, and d is a minimum distance of one of the one or more codes.

22. A communication system, comprising:

means for encoding a sequence of information symbols with one or more codes to generate an encoded sequence;

modulation means for modulating the encoded sequence and transmitting the modulated sequence over a transmission channel;

demodulating means for demodulating the modulated sequence by performing a number of calculations and storing results of the calculations in a memory whenever a maximum capacity defined by a mathematical combination of the number of calculations and stored results is not exceeded; and decoding means for performing one or more decodings to decode portions of the demodulated sequence during which the maximum capacity is exceeded.

23. The system of claim 22, wherein the demodulating means outputs erasures during intervals when the maximum capacity is exceeded.

24. The system of claim 22, wherein the demodulating means outputs soft information during intervals when the maximum capacity is exceeded.

* * * * *